United States Patent Office 3,432,320
Patented Mar. 11, 1969

3,432,320
NONIONIC OIL-IN-WATER ASPHALT EMULSIONS
Armin C. Pitchford, Bartlesville, Okla., assignor to Phillips Petroleum Company, a corporation of Delaware
No Drawing. Filed Oct. 14, 1963, Ser. No. 316,139
U.S. Cl. 106—277         4 Claims
Int. Cl. C08h *17/26;* C08b *9/06*

ABSTRACT OF THE DISCLOSURE

A nonionic oil-in-water asphalt emulsion comprising a nonionic emulsifying agent of the general formula:

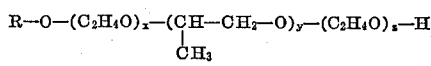

This invention relates to asphalt emulsions. In another aspect it relates to oil-in-water asphalt emulsions of the anionic, cationic, and nonionic types, slurries of such emulsions with aggregate, and methods of preparing and using such emulsions and slurries.

The use of asphalt emulsions in the construction and repair of roads, pavements, soil stabilization, and the like has become increasingly important since the end of World War II. The asphalt emulsions used for such purposes are almost always of the oil-in-water type and are usually classified according to the emulsifying agent employed since the character or properties of the emulsion is dependent on the type of emulsifying agent used. Until recently, the asphalt emulsion most commonly employed was the anionic type, generally made by emulsifying asphalt in water with an anionic emulsifying agent, such as sodium palmitate. Anionic asphalt emulsions form a strong bond with electropositive aggregates such as dolomite and limestone, but poor adhesion with electronegative aggregates, such as gravel and other siliceous material. Cationic asphalt emulsions have recently come into widespread use, and they are generally made by emulsifying asphalt in water with a cationic emulsifying agent, such as a fatty acid diamine hydrochloride or a quaternary ammonium compound. Cationic asphalt emulsions form strong bonds with electronegative aggregates, such as siliceous materials, but, as would be expected, do not form strong bonds with electropositive aggregates. Although anionic and cationic asphalt emulsions enjoy widespread application, many of them have inherent stability limitations when stored or mixed with aggregate, such limitations restricting their use or versatility. Nonionic asphalt emulsions have not been used at all.

Accordingly, an object of this invention is to provide improved asphalt emulsions. Another object is to provide oil-in-water asphalt emulsions of the anionic, cationic, and nonionic types. Another object is to provide an improved method of preparing such emulsions. Another object is to provide an improved method of preparing such slurries. Another object is to provide methods of using such emulsions and slurries in paving and resurfacing roads and the like.

Further objects and advantages of this invention will become apparent to those skilled in the art from the following description and accompanying claims.

I have now discovered that valuable asphalt emulsions having desirable properties can be prepared by emulsifying asphalt in water with a select nonionic emulsifying agent of the general formula:

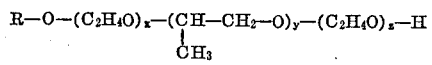

where:

R is selected from the group consisting of hydrogen, aryl, and alkaryl radicals; and
$x$, $y$ and $z$ are integers, such that (1) when $x$ is zero, $y$ is also zero, $z$ is in the range of 20 to 60, inclusive, and said R is one of said aryl and alkylaryl radicals, and (2) when $x$ and $y$ are each greater than zero, the sum of $x$ and $z$ is in the range of 50 to 350, inclusive, and $y$ is in the range of 40 to 60, inclusive.

The nonionic emulsifying agents which are used in this invention, as shown by the above general Formula I, represent a rather narrow class of compounds and they each have a critical balance of a hydrophobic component (propyleneoxy) and a hydrophilic component (ethyleneoxy) which is necessary to prepare asphalt emulsions of this invention. Within the general Formula I given above for these nonionic emulsifying agents, there are two preferred subclasses which can be represented by the following general formulas:

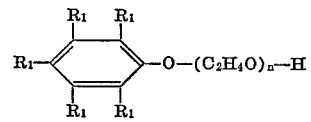

II where $R_1$ is selected from the group consisting of hydrogen and alkyl hydrocarbon radicals (each such alkyl radicals preferably having 1 to 25 carbon atoms, and the total carbon atoms in the sum of such alkyl radicals preferably not exceeding 25), and $n$ is an integer in the range of 20 to 60, inclusive; and

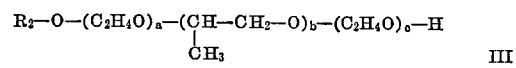

III where $a$ and $c$ are integers greater than zero and whose sum is in the range of 50 to 350, inclusive, $b$ is an integer in the range of 40 to 60, inclusive, and $R_2$ is selected from the group consisting of hydrogen and the hydrocarbon radical:

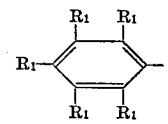

where $R_1$ is as defined above.

Representative examples of the nonionic emulsifying agents which can be used in preparing the novel asphalt emulsions of this invention include:

phenoxynonadeca(ethyleneoxy)ethanol,
phenoxyeicosa(ethyleneoxy)ethanol,
phenoxytricosa(ethyleneoxy)ethanol,
phenoxypentacosa(ethyleneoxy)ethanol,
phenoxyoctacosa(ethyleneoxy)ethanol,
phenoxytriaconta(ethyleneoxy)ethanol,
phenoxyhentriaconta(ethyleneoxy)ethanol, phenoxydotriaconta(ethyleneoxy)ethanol,
phenoxytetraconta(ethyleneoxy)ethanol,
phenoxypentaconta(ethyleneoxy)ethanol,
phenoxynonapentaconta(ethyleneoxy)ethanol,
4-methylphenoxyeicosa(ethyleneoxy)-ethanol,
4-methylphenoxyheneicosa(ethyleneoxy)ethanol,
2,3,6-triethylphenoxy-docosa(ethyleneoxy)ethanol,
4(1,1,3,3 - tetramethylbutyl)phenoxytetracosa(ethyleneoxy)ethanol,
4(1,3,5 - trimethylhexyl)phenoxyhexacosa(ethyleneoxy) ethanol,
4-nonylphenoxyheptacosa(ethyleneoxy)ethanol,
2,3,4,5,6-penta - n - pentylphenoxy-triconta(ethyleneoxy) ethanol,
2(1,3,5 - trimethylhexyl)-4(1,3-dimethylbutyl)-phenoxy-hentriconta(ethyleneoxy)ethanol,
4(3,5,5 - trimethylheptyl)phenoxydotriaconta - (ethyleneoxy)ethanol,
3(3,5,7,7 - trimetyl - 5 - ethylnonyl)phenoxytetraconta-(ethyleneoxy)ethanol,
4(1,1,3,3,5,5,7,7 - octamethyldecyl)phenoxypentaconta-(ethyleneoxy)ethanol,
4 - n - pentacosylphenoxynonapentaconta(ethyleneoxy) ethanol,
3,5-di-n-decyl - 4-n - pentylphenoxynonapentaconta(ethyleneoxy)ethanol,
beta - hydroxyethyleneoxytetraconta(propyleneoxy)octatetraconta(ethyleneoxy)ethanol,
beta - hydroxyethoxyoctatetraconta(ethyleneoxy) tetraconta(propyleneoxy)ethanol,
beta - hydroxyethoxypentaconta(ethyleneoxy)pentaconta (propyleneoxy) deca(ethyleneoxy)-ethanol,
beta - hydroxyethoxyocta(ethyleneoxy)hexaconta(propyleneoxy)nonaconta-(ethyleneoxy)ethanol,
beta - hydroxyethoxyhecta(ethyleneoxy)pentatraconta-(propyleneoxy)hecta(ethyleneoxy)ethanol,
beta - hydroxyethoxydohecta(ethyleneoxy) - hexaconta (propyleneoxy)octatetracontahecta(ethyleneoxy) ethanol,
phenoxyethyleneoxy - pentapentaconta(propyleneoxy) octatetraconta(ethyleneoxy) ethanol,
4 - methylphenoxyl - deca(ethyleneoxy)nonatetraconta (propyleneoxy)pentaconta(ethyleneoxy)ethanol,
4(1,3,5 - trimethylhexyl)phenoxyheptaconta(ethyleneoxy) pentaconta(propyleneoxy) - triconta(ethyleneoxy) ethanol,
4 - n - pentacosylphenoxydicta(ethyleneoxy)pentaconta (propyleneoxy)hecta(ethyleneoxy)ethanol,
2,4,5 - trimethylphenoxypentaconta-hecta(ethyleneoxy) pentaconta(propyleneoxy)hexaconta(ethyleneoxy) ethanol,
2(1,3,5 - trimethylhexyl) - 4-(1,1,3,3 - tetramethylbutyl) phenoxyhecta (ethyleneoxy) hexatetraconta(propyleneoxy)dicta(ethyleneoxy)ethanol,
4 - n - pentacosylphenoxyhecta - (ethyleneoxy)hexaconta (propyleneoxy)nonatetracontadicta(ethyleneoxy) ethanol, and the like, and mixtures thereof.

Many of the nonionic emulsifying agents which can be used in this invention are commercially available, such as Triton X–205, Triton X–305, and Triton X–405, each of which is a mixture of octylphenoxypoly(ethyleneoxy) ethanols with 20, 30 and 40 ehtyleneoxy groups in the poly(ethyleneoxy) chain, respectively, and Pluronic P–104, Pluronic P–105 and Pluronic F–108, which are materials having the general formula $$HO(C_2H_4O)_a(C_3H_6O)_b(C_2H_4O)_cH$$

where the sum of $a$ and $c$ is about 50, 74 or 296, respectively, and where $b$ is about 56.

Any of the above-described nonionic emulsifying agents can be used as the sole essential emulsifying agent to prepare the novel nonionic oil-in-water asphalt emulsions of this invention, or they can be used as primary emulsifying agents in conjunction with secondary emulsifying agents of the cationic type, such as quaternary ammonium compounds or alkyl imidazolines, to prepare the novel cationic oil-in-water asphalt emulsions of this invention, or the nonionic emulsifying agents can be used in conjunction with secondary emulsifying agents of the anionic type, such as alkylaryl sulfonates, sulfates, phosphates, and esters, to prepare the novel anionic oil-in-water asphalt emulsions of this invention. All of these novel asphalt emulsions have desirable storage stability, stability when mixed with aggregate, stability when diluted with water or upon contact with portland cement, and they have excellent pumping characteristics, and other desirable properties. These emulsions are especially useful in slurry seal work and similar applications because of the slow setting character.

The novel asphalt emulsions of this invention can be made, in general, by first preparing a soap solution comprising water (either soft or hard) and the nonionic emulsifying agent and then mixing the soap solution in a colloid mill or the like with the asphalt, the latter being preferably heated to reduce its viscosity. Where a cationic or anionic secondary emulsifying agent is used in conjunction with the nonionic primary emulsifying agent, the secondary emulsifying agent can be added to the soap solution and/or the asphalt, or can be added after emulsification of the asphalt, particularly after cooling the emulsion, or the secondary emulsifying agent can be added in part to the soap solution or asphalt and in part after emulsification. Alternatively, the nonionic asphalt emulsion can be blended with a prepared anionic or cationic asphalt emulsion to obtain an improved anionic or cationic emulsion, respectively. Where such blends are prepared for use in slurries with aggregate, the amount of anionic or cationic emulsion blended with the nonionic emulsion should not exceed 35 weight percent of the blend, otherwise the mixing time will not be long enough or the blended emulsion will break prematurely.

Usually, the emulsifiers and any modifiers or promoters used are dispersed in the water to form the soap solution, which is then warmed to a temperature of 90–200° F., preferably 90–125° F. The asphalt can be heated to a temperature in the range of 150–350° F., preferably 250–300° F. The warm soap solution and hot asphalt are then proportioned to a colloid mill to emulsify the mixture, during which milling the temperature of the mixture can be in the range of 100–210° F., preferably 150–200° F. The completed emulsion can then be cooled to a temperature below 150° F. before being used or transferred to storage.

In preparing the cationic asphalt emulsions, usually an acid is used in making up the soap solution where it is necessary to activate the emulsifying agent, such as the diamine type of cationic emulsifying agent. Representative acids which can be used for this purpose include hydrochloric acid, sulfuric acid, acetic acid, sulfamic acid (NH$_2$SO$_3$H), etc., using a sufficient amount of the acid to impart a pH value of less than 7 to the emulsion, which amount will generally be about 0.05 to 1, preferably about 0.2 to 1, weight percent of the emulsion, although the amount of acid used can be considered and calculated as part of the emulsifying agent. Alkaline cationic asphalt emulsions can be prepared where the cationic emulsifying agent used is a quaternary ammonium compound, like that described hereinafter in connection with general Formula VI, by adding to the soap solution a base such as an alkali metal or alkaline earth metal oxide or hydroxide, such as potassium hydroxide, sodium hydroxide, calcium hydroxide, calcium oxide and barium oxide. The amount of base employed in making such alkaline cationic asphalt emulsions usually will be that sufficient to impart a pH value of 7.5 to 11, preferably 8 to 10.5, which amount will generally be less than 1 weight per cent of the emulsion. In some instances it may be desirable to improve the modified miscibility and cure of slurries of the cationic asphalt emulsion by incorporating into the latter a petroleum naphtha, e.g., on which boils in the range of 120 to 400° F., which naphtha can be added, for example, to the emulsified asphalt, particularly after it is discharged from the colloid mill. The amount of such naphtha used can be 1 to 5, preferably 1.2 to 3.5, weight percent of the emulsion.

In preparing the anionic asphalt emulsions, the emulsifying properties of the secondary anionic emulsifying agent can be enhanced by incorporating an alkaline material like those disclosed above and preferably sodium hydroxide, for example by adding it to the soap solution.

Although not essential, other materials or modifiers used in preparing asphalt emulsions can be incorporated in the novel asphalt emulsions of this invention, including such stabilizing agents as hydroxyethylcellulose, soya flour, aluminum chloride, calcium chloride, etc., viscosifiers such as Carbopol 934 (a carboxy vinyl polymer), preservatives such as Dowcide G (sodium pentachlorophenoxide), etc. Usually, where used, such modifiers will total up to about 0.5 weight percent of emulsion.

The secondary emulsifying agents which are used in combination with the above-described nonionic emulsifying agents in the practice of this invention include any of those known in the prior art. A particularly useful class of cationic emulsifying agents which can be so used are salts of organic nitrogen bases characterized by the presence of at least one basic nitrogen atom in their cation portion, and where the latter contains a long-chain aliphatic hydrocarbon radical of at least 12 and as many as 24 carbon atoms, preferably a straight chain fatty aliphatic group. A particularly useful subclass of such cationic emulsifying agents are the tetra-substituted quaternary ammonium compounds, such as those of the general formula:

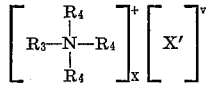

IV where $R_3$ is a long alkyl chain of at least 12 and as many as 24 carbon atoms, and the $R_4$'s are shorted alkyl radicals or benzyl radicals, the presence of which is sufficient to impart oil solubility and emulsifying properties to the salt material, $X'$ is a hydroxyl or an anion such as nitrate, sulfate, secondary phosphate, acetate, benzoate, salicylate and preferably a halogen, such as chlorine or bromine, $v$ is the valence of said hydroxyl or anion, and $x$ is an integer equal to said valence. Another particularly useful subclass of cationic emulsifying agents are the salts of heterocyclic nitrogen bases, such as alkyl pyridine, alkyl quinoline, alkylisoquinoline and alkyl imidazoline, a particularly useful group of the latter being represented by the general formula:

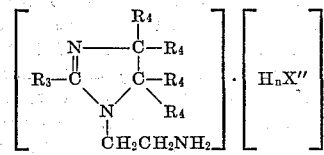

V where $R_3$ is an aliphatic radical selected from the group consisting of alkyl and alkenyl radicals, preferably having having 12 to 24 carbon atoms, $R_4$ is selected from the group consisting of hydrogen and alkyl radicals preferably having 1 to 4 carbon atoms, and $X''$ is an anion such as nitrate, sulfate, secondary phosphate, acetate, benzoate, salicylate and preferably a halogen, such as chlorine and bromine, $n$ is an integer equal to the valence of said anion, and $x$ is an integer of 1 to 3. Primary, secondary and tertiary monoamines and diamines are also useful in this invention, particularly the fatty acid diamines of the general formula $R_3NH(CH_2)_mNH_2$, where $R_3$ is as defined above in Formula V and $m$ is an integer in the range of 1 to 3.

Another particularly useful subclass of cationic emulsifying agents which can be used in combination with the nonionic emulsifying agents (especially where alkaline cationic asphalt emulsions are desired) are those of the general formula

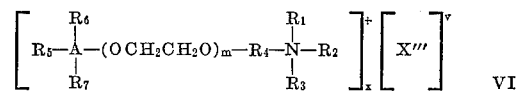

VI where $R_1$ and $R_2$ are lower alkyl hydrocarbon radicals having, for example, 1 to 3 carbon atoms, such as methyl, ethyl, propyl (preferably methyl), $R_3$ is also such an alkyl radical (preferably methyl) or an aryl, alkaryl or aralkyl hydrocarbon radical having, for example, 6 to 7 carbon atoms, such as phenyl, benzyl or tolyl, $R_4$ is a lower alkylene hydrocarbon radical having, for example, 1 to 2 carbon atoms, such as methylene and ethylene, $R_5$ is a long chain alkyl hydrocarbon radical having, for example, 8 to 25, preferably 8 to 20, carbon atoms, such as octyl, dodecyl, pentadecyl, eicosyl and pentacosyl, $R_6$ and $R_7$ are hydrogen atoms or lower alkyl radicals having, for example, 1 to 5 carbon atoms, A is a benzene nucleus, $X'''$ is a hydroxyl or a salt-forming anion such as nitrate, sulfate, secondary phosphate, acetate, benzoate, salicylate and preferably a halogen, such as chlorine or bromine, $m$ is an integer of 0 or 1, $v$ is the valence of said hydroxyl or anion, and $x$ is an integer equal to said valence. These cationic emulsifying agents are quaternary ammonium compounds, and we prefer to use those which are chloride salts and where the sum of carbon atoms in $R_1$, $R_2$ and $R_3$ does not exceed 12 and the sum of carbon atoms in $R_6$ and $R_7$ does not exceed 6.

Representative cationic emulsifying agents which can be used in this invention include cetyltrimethylammonium bromide,
cetyldimethylethylammonium bromide,
"tallow" trimethylammonium chloride (the term "tallow" referring to the radical of a mixture of fatty acids derived from tallow),
n-dodecyltrimethylammonium chloride,
n-dodecyltrimethylammonium bromide,
n-dodecyltrimethylammonium hydroxide,
n-tetradecyltrimethylammonium chloride,
n-hexadecyltripropylammonium iodide,
n-octadecyltri-n-butylammonium nitrate,
n-octadecyltriethylammonium chloride,
n-hexadecyltrimethylammonium chloride,
n-eicosyltrimethylammonium chloride,
n-tetracosyltrimethylammonium acetate,
n-pentadecylethyldimethylammonium chloride,
n-docosylpropyldimethylammonium chloride,
n-tricosyl-n-decyldiethylammonium benzoate,
n-tetradecyl-n-heptyldimethylammonium chloride,
n-octadecyl-n-decyl-dimethylammonium chloride
n-heptadecyldipropylmethylammonium chloride,
n-nonadecyl-di-n-octylmethylammonium chloride,
n-hexadecylethyldimethylammonium chloride,
n-dodecylbenzyldimethylammonium chloride,
n-pentadecylbenzyldiethylammonium fluoride,
n-octadecylpropyldimethylammonium salicylate,
n-dodecyl-n-butylbenzyl-methylammonium bromide,
n-nonadecyldiethylmethylammonium sulphate,
n-eicosyl-trimethylammonium orthophosphate,
1 - (2 - aminoethyl) - 2(4-tetradecenyl)-4,5-di-n-butyl-2-imidazoline,
1 - (2 - aminoethyl)-2(1,1-diethyl-5,7-dodecadienyl)-4,5-dimethyl-2-imidazoline,
1-(2-aminoethyl)-2-n-octadecyl-4-ethyl-2-imidazoline,
1-(2-aminoethyl)-2-n-eicosyl-2-imidazoline,
1-(2-aminoethyl)-2-(1,1-dimethyldecyl)-2-imidazoline,
1-(-2-aminoethyl)-2-(12-heptadecenyl)-2-imidazoline, and
1-(2-aminoethyl)-2-(5,7-heptadecadienyl)-2-imidazoline,
p-n-octylbenzyldimethylphenyl-ammonium chloride,
p-diisobutylbenzyltrimethylammonium chloride,
4-n-nonyl-3,5-dimethylbenzyldiethylbenzylammonium chloride, 2-n-dodecyl-3-methyl-5-isopentyl-phenylethylmethyl-n-butyltolylammonium chloride,
4-(5,6-dimethyl)pentadecyl-3,5-diethylphenylethylmethyl-ethylphenylammonium chloride,
3-methyl-4-n-eicosyl-5-ethylbenzyltriethylammonium chloride,
3,5-di-n-propyl-4-n-pentacosylphenylethyl-di-n-pentyl-tolylammonium chloride,
p-n-octylphenoxyethoxyethyltrimethylammonium chloride,
p-(3-methyldodecyl)benzyltrimethylammonium chloride,
p-diisobutyl-phenoxyethoxyethyldimethylbenzyl-ammonium chloride,
3,5-dimethyl-4-n-octylphenoxy-ethoxyethyldiethylphenyl-ammonium chloride,
2-(3,4,5-triethyl)tetradecyl-3,4-diisopropylphenoxyethoxy-ethylmethyl-n-butyltolylammonium chloride,
p-diisobutyl-cresoxyethoxyethyltrimethylammonium chloride,
3-methyl-5-n-pentyl-4-n-eicosyl-phenoxyethoxyethyl-di-n-butylphenylammonium chloride,
2-methyl-6-n-amyl-4-n-phentacosylphenoxyethoxyethyldi-n-amyl-tolylammonium chloride, and the like,
including mixtures thereof, and the corresponding hydroxides, nitrates, sulfates, phosphates, acetates, benzoates, salicylates, and bromides.

There are a number of commercially available cationic emulsifying agents which can be used in this invention, including Nalcamine CAE (the preferred cationic emulsifying agent of this invention), which is a mixture of 1-(2-aminoethyl)-2-n-aliphatic-2-imidazolines where the aliphatic groups are heptadecenyl and heptadecadienyl;
Hyamine 1622, octylphenoxyethoxyethyldimethyl-benzyl-ammonium chloride;
Hyamine 2389, methyldodecylbenzyltrimethylammonium chloride;
Nalquate G-8-12, 1-(2-oxyethyl)-2-n-alkyl-1 (or 3)-benzyl-2-imidazolinium chlorides;
Diam 11-C (n-alkyl-1,3-propylene amines);
Aliquat 26 monotallowtrimethylammonium chloride;
Alamine 26, primary tallow amine;
Duomeen T, N-alkyltrimethylenediamine; and the like.

Representative anionic emulsifying agents which can be used as secondary emulsifying agents in combination with the nonionic emulsifying agents described hereinabove to prepare the novel anionic asphalt emulsions of this invention include alkylaryl sulfonates, such as methylnaphthalene sodium sulfonate (e.g., Petro-Ag), p-dodecylbenzene sodium sulfonate, n- or iso-p-octylphenoxypoly(ethyleneoxy)ethanol sodium sulfonates, isopropylnaphthalene sodium sulfonate (e.g., Aerosol OS), and tetrahydronaphthalene sodium sulfonate (e.g., Alkanol S), sulfates such as n-hexadecyl sodium sulfate, ammonium lauryl sulfate, and tridecyl sodium sulfate, phosphates such as alkylpolyphosphates (e.g., Estranol CP) and complex amido-phospho salts, and esters such as sodium diamyl sulfo-succinate (e.g., Aerosol AY) and disodium-N-octadecylsulfosuccinate (e.g., Aerosol 18), and the like.

Asphalts which can be employed in the preparation of the novel asphalt emulsions of this invention include any of those bituminous materials used heretofore and known in the prior art, such as natural asphalts or those derived from petroleum refining, for example by steam refining and/or air blowing, etc. Paving asphalts characterized by penetrations (ASTM D-5) from zero to about 300 or even higher, and preferably from about 40-300, and having softening points (ASTM D-36-26) in the range of 90° to 250° F., preferably 100° to 150° F., represent suitable asphalts which can be used.

The relative amounts of the various components of the asphalt emulsions of this invention can vary. Generally, the asphalt will be 50 to 75, preferably 60 to 68, weight percent, the water will be 50 to 25, preferably 31 to 39, weight percent, and the nonionic emulsifying agent will be 0.5 to 3.5, preferably 0.9 to 2.5, weight percent, based on the total weight of the emulsion. Where the cationic or anionic emulsifying agents are employed as secondary emulsifying agents, they each are employed in an amount sufficient to impart to the emulsion the ionic character of the secondary emulsifying agent; generally such an amount will be 0.005 to 0.175, preferably 0.075 to 0.15, weight percent of the emulsion.

The asphalt emulsions of this invention can be applied in paving, resurfacing, coating, etc., and will produce good uniform and smooth coatings. The emulsions can be mixed with aggregate, for example in the ratio of 0.5–5 parts emulsion to 4–10 parts aggregate, and the resulting slurry applied to the surface desired to be treated. After such application, the slurry sets up in the usual manner to provide an adhering coating. The aggregate to be used preferably has a moisture content in the range of 5 to 20 weight percent, and dry aggregate can be prewet to provide this moisture content. The electronegative aggregates, such as gravel, sand, and other siliceous materials, are preferred in preparing slurries of the same with the cationic asphalt emulsions and the electropositive aggregates such as limestone, etc., are preferred in preparing slurries of the same with the anionic asphalt emulsions. Both types of aggregate can be used in preparing slurries of the same with the nonionic asphalt emulsions. In the "slurry seal" technique, moist sand can be mixed with the asphalt emulsion to form a slurry of a consistency similar to that of a Portland cement mix. This slurry can be continuously dumped from a revolving drum mixer or other suitable mixing device onto a road surface, and as the paving vehicle proceeds along the road a rubber drag apron can be used to smooth the slurry to a uniform thickness. For this purpose, a graded sand aggregate containing more than 10 percent fines passing a 200 mesh sieve is preferred. For slow-setting emulsions, at least 1½ to 2 minutes will be usually required to mix the emulsion with the aggregate and spread the resulting slurry on the road surface before the emulsion breaks. In another application, the asphalt emulsion, sand, and Portland cement or diatomaceous earth can be applied to surfaces as a mixture by the "gunnite" method, which is especially suited for coating canals, reservoirs, water ponds, dam facings, etc. Such application can be made with pneumatic-type spray equipment, such as a REFRACT-ALL GUN. Glass wool, rock wool, hemp, cotton, and other fibers can be added to the slurry or emulsion to provide coatings having higher tensile strength and which will not crack with shifting of the base or surface to which the coating is applied.

Further objects and advantages of this invention are illustrated in the following examples, but it should be understood that the various materials used and the amounts thereof, etc., recited in these examples are illustrative of preferred embodiments, and these examples should not be construed to unduly limit this invention.

In the examples which follow, the emusions in each case were prepared by charging a soap solution comprising water and the emulsifying agent and acid or base, where used) to the feed tank of a colloid mill. The asphalt (having a nil acid content) was heated to about 250° or 320° F. and added slowly to the soap solution circulating through the mill. After asphalt addition was complete, milling was continued for 3 to 4 minutes at about 190° F. with a stator-rotor spacing of 0.004 or 0.005 inch. After milling, the emulsions were stored in capped containers at room temperature for a minimum of 24 hours prior to testing.

The aggregate mixing test used in the examples to evaluate the emulsions was that designed to simulate mixing in a slurry seal unit. The apparatus comprised a heavy 4-inch open container equipped with a 3-bladed paddle stirrer powered by a variable speed motor. The aggregate (100 grams) was placed in the assembled vessel and while stirring at low speed the aggregate was wet with about 20 ml. water, after which the speed of the stirrer was increased to about 100 r.p.m. About 20 grams of the emulsion was added rapidly to the wet aggregate. A timer was started at the instant the emulsion contacted the aggregate, and the mixing time was recorded as the time the mix could be stirred before the emulsion broke, as evidenced by solidification of the mix.

Specifications for two of the aggregates used in evaluating the asphalt emulsions according to said mixing test are set forth hereinbelow.

|  | Aggregate | |
| --- | --- | --- |
|  | A | B |
| Source | Baxter Springs, Kans. | Joplin, Mo. |
| Sieve analysis, wt. percent: | | |
| No. 10+ | 2.2 | 2.6 |
| No. 20+ | 17.3 | 28.4 |
| No. 40+ | 33.0 | 29.1 |
| No. 60+ | 18.8 | 14.5 |
| No. 100+ | 15.3 | 12.8 |
| No. 200+ | 6.1 | 6.3 |
| No. 200− | 7.3 | 6.3 |
| Surface area, No. 100− fines, m.²/gm. | <5 | 5 |
| Composition (X-ray diffraction, 100− fines): | | |
| α-Quartz, SiO₂ | +++ | +++ |
| Dolomite, CaMg(CO₃)₂ | + | + |
| Calcite, CaCO₃ | + | + |
| Calcium in total aggregate as percent CaCO₃ | 3.6 | 8.5 |

A third aggregate which was used in one example was a 50/50 mixture of river sand and limestone screenings, and this third aggregate is hereinafter referred to as Aggregate C.

The emulsions were also evaluated by two other tests (according to ASTM D 244-60) called the modified miscibility test and the cement mixing test. The modified miscibility test indicates the ability of the emulsion to withstand dilution with water without breaking and gives a measure of the over-all stability of the emulsion; a modified miscibility of less than 4.5 percent indicates such stability. The cement mixing test indicates the stability of the emulsion in the presence of portland cement, and the lower its value the greater such stability.

Example I

Two slow-setting nonionic oil-in-water emulsions of this invention were prepared, using Triton X–305 and Pluronic F–108, and evaluated. For purposes of comparison, a third nonionic emulsion was prepared using a nonionic emulsifying agent outside the scope of those used in this invention. Table I sets forth the compositions of the asphalt emulsions and their properties.

TABLE I

|  | Emulsions | | |
| --- | --- | --- | --- |
|  | 1 | 2 | 3 ² |
| Composition: | | | |
| Asphalt (50–200 pen.), wt. percent | 64.4 | 67.7 | 65.0 |
| Nonionic emulsifier,¹ wt. percent | 2.0 | 1.0 | 2.0 |
| Water, wt. percent | 33.6 | 31.3 | 33.0 |
| Properties: | | | |
| Cement mixing test, percent | 0 | 0 | ---- |
| Modified miscibility test, percent | 1.5 | 3.2 | ---- |
| Aggregate mixing test, sec.: | | | |
| Aggregate A | 500+ | 300+ | ---- |
| Aggregate B | 500+ | 300+ | ---- |
| Aggregate C | 500+ | 300+ | ---- |

¹ Nonionic emulsifiers used in preparing emulsions 1 and 2 were Triton X–305 and Pluronic F–108, respectively, whereas that used in preparing emulsion 3 was Triton X–114, which is like Triton X–305 but has only 7–8 ethyleneoxy groups in the poly(ethyleneoxy) chain.
² Emulsion 3 was a water-in-oil emulsion, which could not be tested.

Note that Emulsions 1 and 2 of Table I both passed the modified miscibility and cement mixing tests and that these emulsions had extended stability when admixed with the various aggregates, whereas Emulsion 3 (using an emulsifying agent outside the scope of this invention) was completely inoperable because it was a water-in-oil emulsion.

Example II

Five nonionic asphalt emulsions of this invention were prepared and evaluated. The compositions of these emulsions and their properties are set forth in Table II.

TABLE II

|  | Emulsions | | | | |
| --- | --- | --- | --- | --- | --- |
|  | 1 | 2 | 3 | 4 | 5 |
| Compositions: | | | | | |
| Asphalt (85–100 pen.), wt. percent | 64.8 | 64.0 | 66.6 | 62.8 | 66.1 |
| Nonionic emulsifier, wt. percent: | | | | | |
| Triton X–305 | 2.3 | 2.5 | 2.4 | 0 | 0 |
| Triton X–405 | 0 | 0 | 0 | 2.7 | 2.4 |
| Water | 32.9 | 33.5 | 31.0 | 34.5 | 31.5 |
| Properties: | | | | | |
| pH ¹ | 3 | 3 | 7 | 3 | 7 |
| Cement mixing test, percent | ⁵Trace | Trace | Trace | Trace | Trace |
| Modified miscibility, percent | 0.3 | 0.6 | 1.8 | 0.4 | 2.3 |
| Aggregate mixing test: ² | | | | | |
| Time, sec. | 180+ | 180+ | 180+ | 180+ | 180+ |
| Appearance of slurry ³ | E | E | E | E | E |
| Cure after 3 hrs.⁴ | H | H | H | H | H |

¹ Sufficient HCl was added to Emulsions 1, 2 and 4 to impart acid pH.
² Aggregate A was used in mixing tests.
³ E = excellent slurry, because of smooth texture with 95–100% of aggregate coated with asphalt.
⁴ H = essentially hard coating after 3 hrs. at 85–95° F. in moderate to strong sunlight.
⁵ Trace = too small to measure (i.e., <0.1%).

The data of Table II shows that all the nonionic emulsions passed the modified miscibility and cement mixing tests, all of them produced slurries having an excellent appearance, and all of these slurries were hard at the end of a 3-hr. curing period.

Example III

Three cationic oil-in-water asphalt emulsions of this invention were prepared and evaluated. Their compositions and properties are set forth in Table III.

TABLE III

|  | Emulsions | | |
| --- | --- | --- | --- |
|  | 1 | 2 | 3 |
| Composition: | | | |
| Asphalt (100–120 pen.), wt. percent | 64.0 | 64.8 | 65.6 |
| Nonionic emulsifier, wt. percent: Triton X–305 | 2.4 | 2.0 | 2.0 |
| Cationic emulsifier, wt. percent: | | | |
| Hyamine 10–X | 0.05 | 0 | 0 |
| Nalcamine CAE | 0 | 0.1 | 0.1 |
| Naphtha ⁵ | 0 | 0 | 2.5 |
| Water | 33.4 | 33.1 | 29.8 |
| Properties: | | | |
| pH ¹ | 3 | 3 | 3 |
| Cement mixing test, percent | Trace | 0 | 0 |
| Modified miscibility, percent | 1.0 | 15.9 | 1.0 |
| Aggregate mixing test: ² | | | |
| Time, sec. | 180+ | 180+ | 180+ |
| Appearance of slurry ³ | E | E | E |
| Cure after 3 hrs.³ | H | ⁴T | H |

¹ Sufficient HCl was added to all emulsions to impart acid pH.
² Aggregate used for Emulsion 1 was Aggregate A and that used for Emulsions 2 and 3 was Aggregate C.
³ For definitions of E and H, see footnotes of Table II.
⁴ T = tacky slurry after 3 hrs. at 85–95° F. in moderate to strong sunlight.
⁵ Stoddard solvent.

Note that in Table III that the rather high modified miscibility of Emulsion 2 and the tacky nature of its slurry after three hours can be improved by adding naphtha, as shown by the properties of Emulsion 3.

Example IV

An anionic oil-in-water asphalt emulsion of this invention was prepared and evaluated. The composition of the emulsion and its properties are set forth in Table IV.

TABLE IV

Composition:
Asphalt (85–100 pen.), wt. percent _____ 64.9
Nonionic emulsifier (Triton X–305), wt. percent _____ 2.0
Anionic emulsifier (Petro-Ag), wt. percent __ 0.1
Water, wt. percent _____ 33.0

TABLE IV—Continued

Properties:
- pH _____ 8.2
- Cement mixing test, percent _____ Trace
- Modified miscibility, percent _____ 2.3

Aggregate mixing test:[1]
- Time, sec. _____ 180+
- Appearance of slurry _____ Excellent
- Cure after 3 hrs. _____ Hard

[1] Using Aggregate A.

Various modifications and alterations of this invention will become apparent to those skilled in the art without departing from the scope and spirit of this invention, and it should be understood that this invention is not to be limited unduly to that set forth herein for illustrative purposes.

I claim:

1. An oil-in-water asphalt emulsion consisting essentially of asphalt, water, and a nonionic emulsifying agent of the general formula:

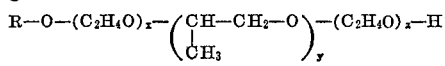

where:
- R is selected from the group consisting of hydrogen, aryl, and alkylaryl radicals; and
- $x$, $y$ and $z$ are integers, such that (1) when $x$ is zero, $y$ is also zero, $z$ is in the range of 20 to 60, inclusive, and R is one of said aryl and alkylaryl radicals, and (2) when $x$ and $y$ are each greater than zero, the sum of $x$ and $z$ is in the range of 50 to 350, inclusive, and $y$ is in the range of 40 to 60, inclusive, and wherein said nonionic emulsifying agent is the sole emulsifying agent in said emulsion and the latter is of the nonionic type.

2. The nonionic oil-in-water asphalt emulsion of claim 1 wherein the nonionic emulsifying agent is octylphenoxypoly(ethyleneoxy)ethanol having about 30 ethyleneoxy groups in the poly(ethyleneoxy) chain.

3. The nonionic oil-in-water asphalt emulsion of claim 1 wherein the nonionic emulsifying agent is octylphenoxypoly(ethyleneoxy)ethanol having about 40 ethyleneoxy groups in the poly(ethyleneoxy) chain.

4. The nonionic oil-in-water asphalt emulsion of claim 1 wherein the nonionic emulsifying agent is a compound of the formula

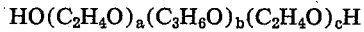

where the sum of $a$ and $c$ is about 296 and $b$ is about 56.

References Cited

UNITED STATES PATENTS

| | | | |
|---|---|---|---|
| 3,345,193 | 10/1967 | Pitchford | 106—277 XR |
| 3,366,500 | 1/1968 | Kracuner | 106—277 XR |
| 2,901,369 | 8/1959 | Pordes. | |
| 2,993,002 | 7/1961 | Wright et al. | 252—311.5 |
| 2,993,003 | 7/1961 | Mertens et al. | 252—311.5 |
| 3,108,441 | 10/1963 | Watson | 106—287 |
| 3,123,569 | 3/1964 | Borgfeldt | 106—277 XR |
| 3,126,350 | 3/1964 | Borgfeldt | 106—277 XR |
| 3,220,953 | 11/1965 | Borgfeldt | 106—277 XR |
| 3,276,886 | 11/1966 | Pitchford et al. | 106—277 |
| 3,276,887 | 11/1966 | Pitchford | 106—277 |

JULIUS FROME, *Primary Examiner.*

JOAN B. EVANS, *Assistant Examiner.*

U.S. Cl. X.R.

106—283; 252—311.5